United States Patent [19]

Neko

[11] Patent Number: 4,806,089
[45] Date of Patent: Feb. 21, 1989

[54] INJECTION-MOLDING MACHINE WITH VARIABLE INJECTION ACCELERATION/DECELERATION TIME

[75] Inventor: Noriaki Neko, Hachioji, Japan
[73] Assignee: Fanuc Ltd., Minamitsuru, Japan
[21] Appl. No.: 130,236
[22] PCT Filed: Mar. 20, 1987
[86] PCT No.: PCT/JP87/00173
§ 371 Date: Nov. 9, 1987
§ 102(e) Date: Nov. 9, 1987
[87] PCT Pub. No.: WO87/05558
PCT Pub. Date: Sep. 24, 1987

[30] Foreign Application Priority Data

Mar. 20, 1986 [JP] Japan .................. 61-60872

[51] Int. Cl.$^4$ .......................................... B29C 45/77
[52] U.S. Cl. .................................... 425/145; 425/171; 264/40.7
[58] Field of Search ............... 425/145, 149, 150, 171; 264/40.7

[56] References Cited

U.S. PATENT DOCUMENTS 3,767,339 10/1973 Hunkar .................................. 425/149

FOREIGN PATENT DOCUMENTS 70454 4/1984 Japan .

Primary Examiner—Jay H. Woo
Assistant Examiner—Timothy W. Heitbrink
Attorney, Agent, or Firm—Staas & Halsey

[57] ABSTRACT

Disclosed is an injection-molding machine in which the injection acceleration/deceleration time can be varied in accordance with parameters related to injectin, such as the properties of resin, etc., thus permitting injection-speed control under optimum conditions.

Pulse distribution is preformed with a predetermined cycle in accordance with a set injection speed (V1~V3) for an injection-speed control step corresponding to a detected screw position. A certain number (Pb) of pulses are delievered as an output, the number being obtained by dividing, by a predetermined value (n), the result of addition of the number (Pa) of distributed pulses for the current cycle and the number (X1~Xn1−) of distributed pulses for a period equivalent to a predetermined number of cycles preceding the current cycle. Thus, the acceleration/deceleration processing is accomplished, and an injecting operation is performed with an optimum acceleration/deceleration characteristic.

2 Claims, 3 Drawing Sheets

INJECTION-MOLDING MACHINE WITH VARIABLE INJECTION ACCELERATION/DECELERATION TIME

TECHNICAL FIELD

The present invention relates to injection control of an injection-molding machine, and more particularly, to acceleration/deceleration control of the injection speed of an injection-molding machine controlled by means of a numerical control unit.

BACKGROUND ART

In injection-molding machines, injection-speed control is generally performed in a manner such that a screw is driven for injection at an optimum injection speed for each of three or four sections, into which the injection stroke of the screw is divided. According to known injection-molding machines, an injection device is driven by means of hydraulic oil pressure. Meanwhile, a system has been developed such that the injection device is driven by means of a servomotor. In the servomotor drive system, however, the screw sometimes cannot force out a rigid resin whose viscosity in a fused state is low. The screw often fails to force out the rigid resin particularly if the acceleration/deceleration time (time constant) for its injecting operation, or the time before the screw reaches a set position, is shortened, that is, if the responsiveness is improved, in order to inject the resin in a short period of time. In such a case, the error between the values of an actual injection speed and an injection-speed command issued to the servomotor increases, so that an alarm may possibly be given. In this situation, it is troublesome, for example, to examine the cause of the alarm. In some cases, injection control should be performed so that the command speed is reached gradually by increasing acceleration/deceleration time, depending on the mold shape.

SUMMARY OF THE INVENTION

An object of the present invention is to provide an injection-molding machine which is free of the aforementioned drawbacks of the known machines, and in which the acceleration/deceleration time for the injection speed can be varied in accordance with parameters associated with injection, such as the properties of the resin to be injected, the shape of the mold used, etc., thereby ensuring injection-speed control under optimum conditions.

In order to achieve the above object of the present invention, there is provided an injection-molding machine controlled by means of a numerical control unit, which comprises setting means for setting an injection speed for each of injection-speed control steps, an injection-speed changing screw position, an injection-to-hold switching screw position, and an injection acceleration/deceleration time; memory means for storing individual set values set by means of the setting means; screw position detecting means for detecting the screw position; discrimination means for discriminating the injection-speed control step to which the screw position detected by the screw position detecting means corresponds, through comparison between the detected screw position and the set injection-speed changing screw position and between the detected screw position and the injection-to-hold switching screw position; pulse distribution means adapted to read the set injection speed of the step discriminated by the discrimination means from the memory means, and to perform pulse distribution corresponding to the read injection speed; and acceleration/deceleration control means for processing the output of the pulse distribution means for acceleration and deceleration in accordance with the set acceleration/deceleration time.

According to the present invention, as described above, the injection is accelerated or decelerated at an optimum acceleration corresponding to the acceleration/deceleration time, set in accordance with the hardness of the resin, at the time of switching the injection speed. Accordingly, the screw can securely avoid a situation such that it fails to force out the resin, and no troubles can be caused due to production of alarms.

BEST MODE OF CARRYING OUT THE INVENTION

Figure 1:
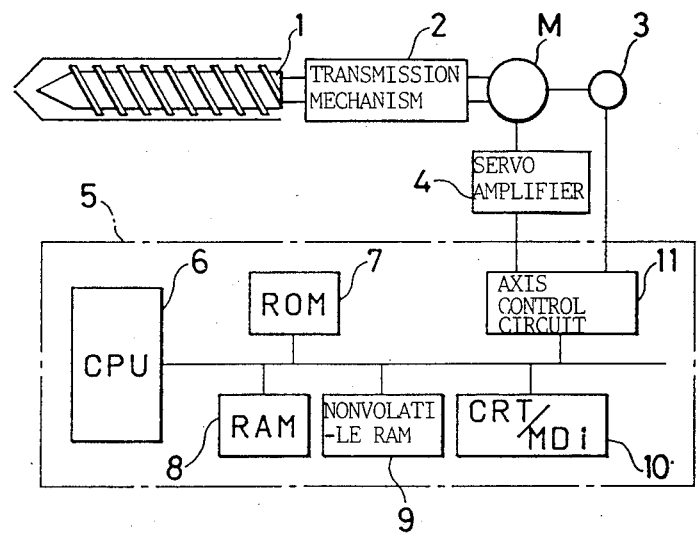
FIG. 1 is a schematic view showing the principal part of an injection-molding machine according to an embodiment of the present invention.

FIG. 1 shows the principal part of an injection-molding machine according to an embodiment of the present invention. In FIG. 1, numeral 1 denotes a screw, and numeral 2 denotes a transmission mechanism which converts the rotation of a servomotor M into an axial linear motion of the screw 1, thereby causing the screw to perform an injecting operation. Numeral 5 denotes a numerical control unit having a computer therein. The unit 5 includes a microcomputer (hereinafter referred to as CPU) 6, a ROM 7 storing a control program for controlling the injection-molding machine, a RAM 8 adapted for temporary storage of data and the like, and a nonvolatile RAM 9. The nonvolatile RAM 9 stores various set values and commands, such as the injection speed for each injection-speed control step, injection-speed changing screw positions, injection-to-hold switching screw position, injection acceleration/deceleration time, etc. Numeral 10 denotes a manual-data input device with a CRT display (hereinafter referred to as CRT/MDi). The aforesaid various set values and commands are inputted through a manual data input section (not shown) of the CRT/MDi 10, and various data are displayed on a CRT display unit. Numeral 11 denotes an axis control circuit which serves to control the speed of the servomotor M and the like, with the aid of a servo amplifier 4, in response to feedback signals from a position detector 3, such as a pulse encoder, which is attached to the servomotor M.

First, the principle of operation of the present invention will be described.

Figure 2:
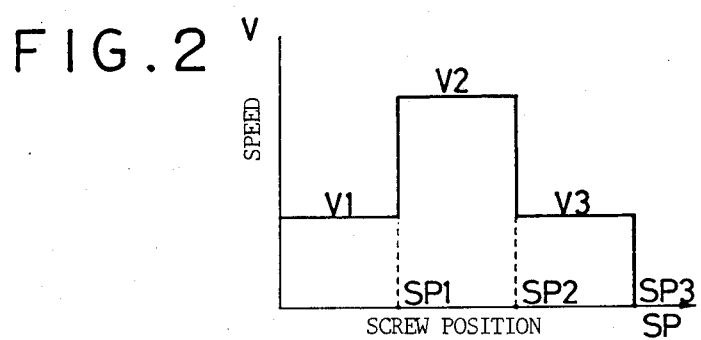
FIG. 2 is a diagram illustrating set values of injection speed according to the invention.
Figure 3:
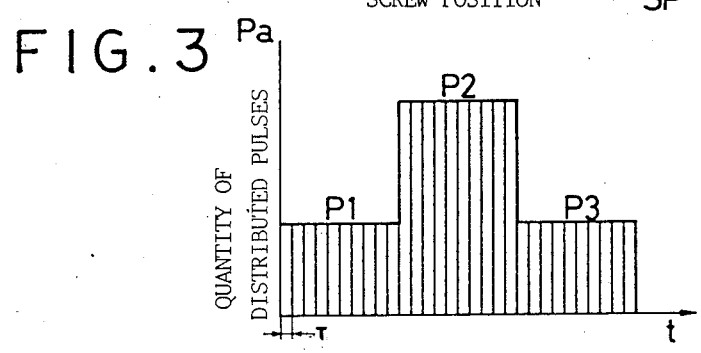
FIG. 3 is a diagram illustrating a pulse distribution according to the invention.

By way of example, the following case will be explained. As shown in FIG. 2, three steps are provided for injection-speed control such that the injection speeds for the individual steps are adjusted to V1, V2 and V3. Moreover, the injection speed is changed at screw positions SP1 and SP2, and the injection-speed control is switched over to hold-pressure control at a screw position SP3. In this case, the CPU 6 of the numerical control unit 5 distributes a certain number of pulses corresponding to a command injection speed Vi for an i'th injection-speed control step (i=1, 2, 3) with every predetermined cycle or sampling cycle T (hereinafter referred to as pulse distribution Pi), as shown in FIG. 3. More specifically, before the screw reaches the injection-speed changing position SP1, pulse distribution P1 corresponding to the command injection speed V1 is performed with every sampling cycle T. Subsequently, before the screw reaches the injection-speed changing position SP2, pulse distribution P2 corresponding to the command injection speed V2 is performed with every sampling cycle T. Thereafter, before the screw reaches the injection-to-hold switching position SP3, pulse distribution P3 corresponding to the command injection speed V3 is performed with every sampling cycle T.

According to the present invention, moreover, acceleration/deceleration processing is performed on the basis of the number of distributed pulses during a period equivalent to a predetermined sampling frequency preceding the current cycle, with every sampling cycle.

The acceleration/deceleration processing will now be described in detail. Here let it be supposed that the acceleration/deceleration time, between the start and end of acceleration or deceleration, is $\tau$, and a numerical value obtained by dividing the acceleration/deceleration time $\tau$ by the sampling cycle T is n (n=$\tau$/T).

First, the total number (Pa+X1+ ... +Xi+ ... +Xn−1) of pulses, which are distributed during a time interval between the current sampling cycle, in an a'th step (a=1, 2, 3), and the sampling cycle preceding the current sampling cycle by (n−1) cycles, is obtained by addition. Here Pa is the number of pulses distributed during each sampling cycle of the a'th step, and Xi (i=1, 2, ..., n−1) is the number of pulses distributed during the sampling cycle preceding the current sampling cycle by i cycles. Then, the result of the addition is divided by n, whereupon a value Pb equal to the right side of the following equation (1).

$$Pb=(Pa+X1+X2+ ... Xn-1)/n. \quad (1)$$

Pulses of the number equal to Pb are delivered as output pulses after the acceleration/deceleration processing, in the current sampling cycle.

If the number Pa of distributed pulses for each sampling cycle T of the first step is Pa=P1=100, and if the sampling cycle T and the acceleration/deceleration time $\tau$ are 8 msec and 40 msec, respectively, n=40/8=5 is obtained. In the first sampling cycle of the first step immediately after the start of injection, Pa=P1=100 and X1~X4=0 are given, so that the pulse number Pb is $$Pb=(Pa+X1+X2 ... Xn-1)/n=100/5=20.$$

In the second sampling cycle, Pa=P1=100, X1=100, and X2~X4=0 are given, so that the pulse number Pb is $$Pb=(100+100)/5=40.$$

In the third sampling cycle, the pulse number Pb is $$Pb=(100+100+100)/5=60.$$

Figure 4:
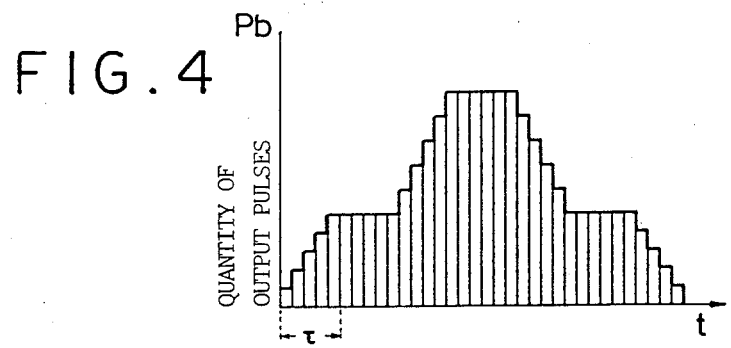
FIG. 4 is a diagram showing the number of output pulses produced by an acceleration/deceleration process according to the invention.
Figure 5:
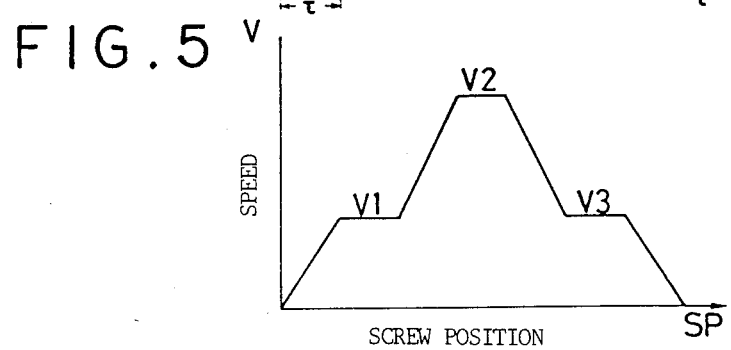
FIG. 5 is a diagram showing the relationship between the screw position and the injection speed depending on the output pulses of FIG. 4.

Likewise, Pb=80 and Pb=100 are given in the fourth and fifth sampling cycles, respectively. In the first step, thereafter, output pulses of the number equal to the command value or 100 continue to be delivered with every cycle. As a result, the output pulse number Pb increases linearly with the lapse of time, as shown in FIG. 4. After the command value is reached, the number Pb takes a value corresponding to the command value. Thereupon, the injection speed also increases linearly and reaches the command speed V1, as shown in FIG. 5.

The acceleration/deceleration processing is performed in the aforesaid manner until the changing screw position SP1, at which the screw is shifted from the first step to the second step, is reached. Then, the second step is entered. If the number Pa of distributed pulses for each sampling cycle of the second step is Pa=P2=250, Pa=250 and X1~X4=100 are given in the first sampling cycle of the second step, so that the pulse number Pb in this cycle is $$Pb=(250+100+100+100+100)/5=130.$$

Likewise, the number Pb in the second cycle is $$Pb=(250+250+100+100+100)/5=160.$$

In like manner, Pb=190, Pb=220, and Pb=250 are given in the third, fourth, and fifth cycles, respectively. Thereafter, until the next changing screw position SP2 is reached, that is, until the end of the pulse distribution for the second step, pulses of the number equal to Pb=250 are delivered periodically, so that the screw is driven at the set speed V2.

When the pulse distribution Pa=P3, which corresponds to the next set speed V3, is started after the changing point SP2 is reached by the screw, the number Pb of pulses delivered according to the acceleration/deceleration control is obtained as aforesaid. More specifically, if Pa=P3=100 is given, the pulse number Pb for the first sampling cycle of the third step is $$Pb=(100+250+250+250+250)/=220.$$

Pb=190, Pb=160, Pb=130, and Pb=100 are obtained in the second, third, fourth, and fifth cycles, respectively. As shown in FIGS. 4 and 5, both the number of distributed pulses and the injection speed after the acceleration/deceleration processing decrease in a straight line with the lapse of time. In and after the fifth cycle, the distributed pulse number is at a fixed value (=100), and the set speed also takes the fixed value V3.

When the pulse distribution Pa up to a switching position S3 for hold ends, the pulse distribution Pa for the next sampling cycle is Pa=0, and the number Pb of pulses delivered according to the acceleration/deceleration control takes the following values.

In the first cycle, Pb is $$Pb=(0+100+100+100+100)/5=80.$$

In the second cycle, Pb is $$Pb=(0+0+100+100+100)/5=60.$$

In the third cycle, Pb is

Pb=(0+0+0+100+100)/5=40.

In the fourth cycle, Pb is

Pb=(0+0+0+0+100)/5=20.

In the fifth cycle, Pb is

Pb=(0+0+0+0+0)/5=0.

As the acceleration/deceleration control is effected in this manner, the pulse distribution is accomplished as shown in FIG. 4, and the screw is driven with acceleration or deceleration, as shown in FIG. 5. Thus, if the acceleration/deceleration time $\tau$ is lengthened, the time required for the attainment of the set speed by the actual speed of the screw lengthens. If the acceleration/deceleration time $\tau$ is shortened, on the other hand, the time required for the attainment of the set speed shortens. If the acceleration/deceleration time is lengthened, the time required for the pulse distribution Pb up to the switching position SP3 for hold to be finished is naturally increased in proportion, and the injection of resin is performed with slower acceleration or deceleration. Thus, it is necessary only that the acceleration/deceleration time $\tau$ be set to an optimum value in accordance with the hardness of the resin.

Figure 6:
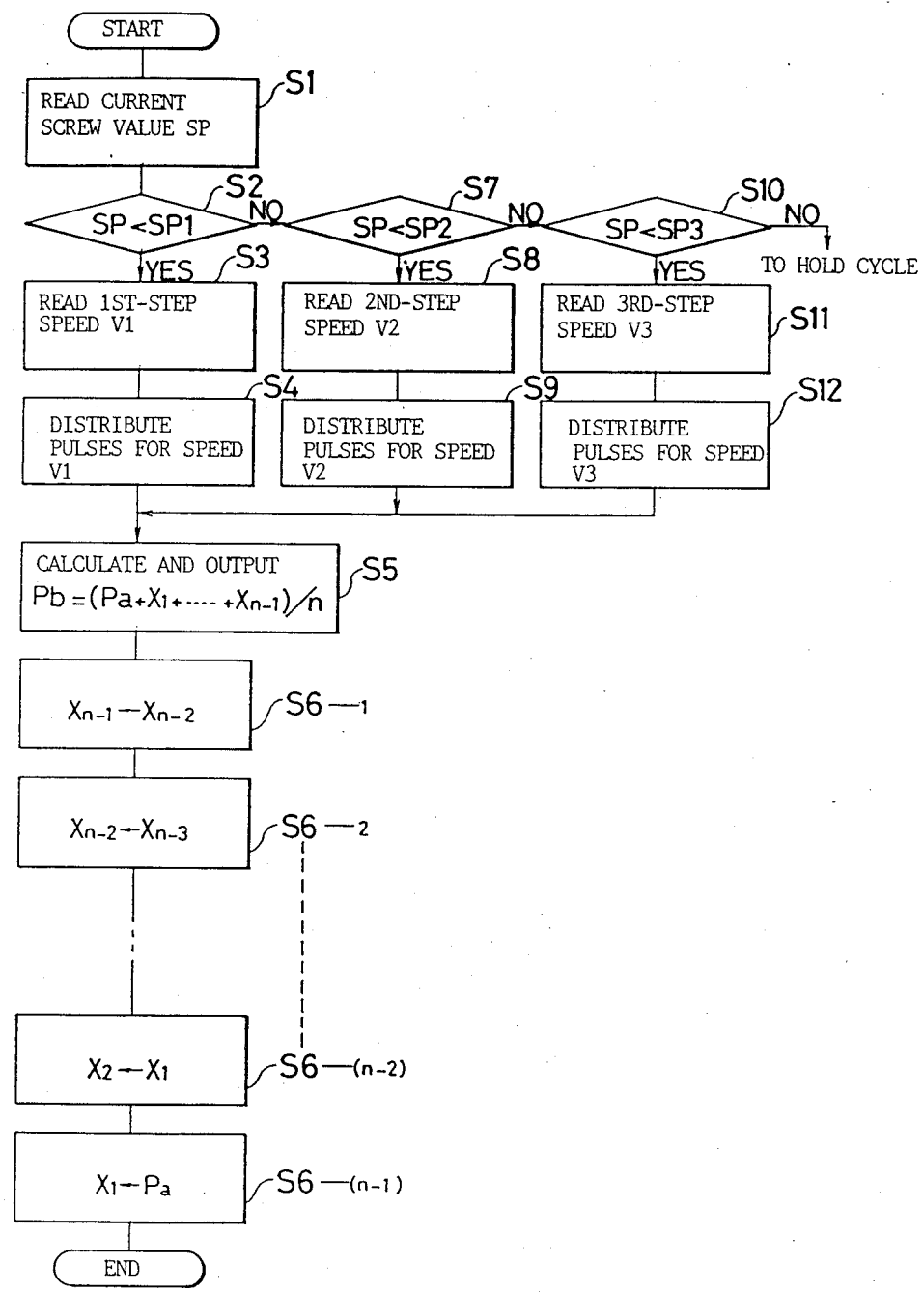
FIG. 6 is a flow chart showing an injection control operation of the injection-molding machine of FIG. 1.

Referring now to the operational flow chart of FIG. 6, the injection control operation of the injection-molding machine according to the present embodiment will be described. In this case, the injection steps are three in number, as shown in FIG. 2.

The injection speeds V1 to V3, for the individual injection-speed control steps, and the injection-speed changing positions SP1 to SP3 are set individually by means of the CRT/MDi 10, and are stored in the nonvolatile RAM 9. Further, the aforesaid n ($=\tau/T$) corresponding to the acceleration/deceleration time $\tau$ is set and stored, depending on the resin hardness (n may alternatively be calculated by means of the CPU 6 after setting the acceleration/deceleration time $\tau$).

When the injection is started, the CPU 6 reads a current screw position SP or the stored value of a current-value register which stores the quantity of distributed pulses delivered with respect to the screw axis (Step S1). Subsequently, the current screw position SP and the position SP1 for the changeover from the first step to the second step are read out from the nonvolatile RAM 9 and compared with each other (Step S2). If the current screw position SP is short of the changing position SP1, the injection speed V1 for the first step is read out from the nonvolatile RAM 9 (Step S3), and the pulse distribution Pa (=P1) for the injection speed V1 is performed (Step S4). Then, the aforesaid acceleration/deceleration control is executed. Thus, the CPU 6 adds the current number Pa of distributed pulses and all of the stored values of memory sections Xn−1 to X1 in the RAM 8 which individually store the pulse numbers Pa (a=1~3) for the sampling cycles T, from the cycle preceding the current cycle by (n−1) cycles to the immediately preceding cycle. The resulting value is divided by the aforesaid n, that is, calculation on the equation (1) is executed. Pulses of the number equal to the resulting value Pb are delivered to the axis control circuit 11, so that the servomotor M is driven by means of the circuit 11 and the servo amplifier 4 (Step S5). Then, the values in the memory sections X1 to Xn−1 are shifted; the memory sections Xn−1, Xn−2, and X2 are stored with values Xn−2, Xn−3, and X1, respectively, and the memory section X1 is stored with the pulse number Pa for the current sampling cycle read from a processing program (Steps S6-1 to S6-(n−1)).

In the next sampling cycle, processing is started at Step S1. Thus, the processes of Steps S1 to S5 and S6-1 to S6-(n−1) are repeated until the screw position SP reaches the changing point SP1 for the changeover from the first step to the second step. When the current screw position SP passes the second-step start position SP1 (Steps S2 and S7), the injection speed V2 for the second step is read from the nonvolatile RAM 9 (Step S8), and the pulse distribution P2 corresponding to the injection speed V2 is performed (Step S9). The output pulse number Pb is delivered which is obtained through the calculation on the equation (1) on the basis of the distributed pulse number P2 and the like (Step S5). Then, the stored values of the memory sections X1 to Xn−1 are shifted in the same manner as aforesaid (Steps S6-1 to S6-(n−1)). The same processing is performed also in the next cycle. When the screw position SP passes the third-step start position SP2 (Steps S2, S7 and S10), the injection speed V3 for the third step is read in the same manner as aforesaid, and the pulse distribution P3 corresponding to this injection speed is performed (Steps S11 and S12). Then, the processes of Step S5 and the steps subsequent thereto are executed on the basis of the distributed pulse number P3 and the like. Thus, the processing is performed for each sampling cycle, and a hold cycle is entered when the screw position SP reaches the switching position SP3 for hold.

The foregoing is considered illustrative only of the principles of the invention. Further, since numerous modifications and changes will readily occur to those skilled in the art, it is not desired to limit the invention to the exact constructions and operation shown and described. Accordingly, all suitable modifications and equivalents may be resorted to that fall within the scope of the invention and the appended claims.

What is claimed is:

1. Apparatus for controlling an injection-molding machine, comprising:
   means for outputting an injection speed command pulse distribution value at a different quantity for plural control steps, each of the plural control steps having a predetermined duration;
   means for computing a numeric value n based on the ratio of a predetermined acceleration and deceleration time period to a sampling cycle time period, wherein said acceleration and deceleration time period comprises plural sampling cycle time periods;
   means for adding the total number of pulses distributed during a time interval between a current sampling cycle time period and the sample cycle time period preceding the current sampling cycle by n−1 cycles;
   means for dividing the total number of added pulses by n and obtaining a quotient; and
   means for adjusting the injection speed command pulse distribution according to the quotient.

2. An injection-molding machine comprising:
   an injection screw actuated by a motor and being operable at different injection speeds for different screw positions;

a position detector connected to the motor and being operable to detect screw positions and output a signal indicative of screw position;

memory means for storing process parameters including an injection speed for each control step, screw position correspond to injection-speed changes between control steps, an injection-to-hold switching screw position, and an injection acceleration/deceleration time period;

means for outputting an injection speed command pulse distribution value at a different quantity for plural control steps, each of the plural control steps having a predetermined duration;

means for computing a numeric value n based on the ratio of a predetermined acceleration and deceleration time period to a sampling cycle time period, wherein said acceleration and deceleration time period comprises plural sampling cycle time period, wherein;

means for adding the total number of pulses distributed during a time interval between a current sampling cycle time period and the sample cycle time period preceding the current sampling cycle by n−1 cycles;

means for dividing the total number of added pulses by n and obtaining a quotient; and means for adjusting the injection speed command pulse distribution according to the quotient, and injection speed control means, operable in response to the adjusted injection speed command pulse distribution, for adjusting the speed of the motor.

* * * * *